US012572836B2

(12) United States Patent
Singh

(10) Patent No.: US 12,572,836 B2
(45) Date of Patent: Mar. 10, 2026

(54) INTELLIGENT PROVISIONING OF QUANTUM PROGRAMS TO QUANTUM HARDWARE

(71) Applicant: Bank of America Corporation, Charlotte, NC (US)

(72) Inventor: Shailendra Singh, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 582 days.

(21) Appl. No.: 18/111,649

(22) Filed: Feb. 20, 2023

(65) Prior Publication Data

US 2024/0354615 A1     Oct. 24, 2024

(51) Int. Cl.
*G06N 10/40* (2022.01)
*G06N 10/80* (2022.01)

(52) U.S. Cl.
CPC ............. *G06N 10/40* (2022.01); *G06N 10/80* (2022.01)

(58) Field of Classification Search
CPC ................................ G06N 10/40; G06N 10/80
See application file for complete search history.

(56) References Cited

U.S. PATENT DOCUMENTS

| | | | |
|---|---|---|---|
| 10,452,989 B2 | 10/2019 | Majumdar | |
| 10,803,395 B2 | 10/2020 | Pistoia et al. | |
| 11,010,145 B1 * | 5/2021 | Smith | G06F 8/41 |
| 11,281,988 B1 | 3/2022 | Naveh et al. | |
| 11,373,114 B1 | 6/2022 | Naveh et al. | |
| 11,494,681 B1 | 11/2022 | Peterson et al. | |
| 11,531,922 B2 | 12/2022 | Zou | |
| 11,544,613 B2 | 1/2023 | Olivadese et al. | |
| 11,797,276 B1 * | 10/2023 | Shi | G06N 10/00 |
| 11,829,753 B1 * | 11/2023 | Smith | G06N 10/80 |
| 11,983,600 B2 * | 5/2024 | Bello | G06N 10/80 |
| 12,333,602 B1 | 6/2025 | Ghosh et al. | |
| 2015/0006443 A1 | 1/2015 | Rose et al. | |
| 2017/0351512 A1 | 12/2017 | Iwanir et al. | |

(Continued)

OTHER PUBLICATIONS

Garcia-Alonso, J. et al., "Quantum software as a service through a quantum api gateway," IEEE Internet Computing, vol. 26, Issue 1 (Jan.-Feb. 2022) 8 pp. (Year: 2022).

*Primary Examiner* — David E Choi
(74) *Attorney, Agent, or Firm* — Banner & Witcoff, Ltd.

(57) ABSTRACT

Arrangements for intelligent provisioning of quantum programs to quantum hardware are provided. In some aspects, a quantum program of a plurality of quantum programs to be executed on target quantum hardware may be received from a digital computing device. The quantum program may be scanned and optimized for minimum quantum bit (qubit) consumption using one or more machine learning models. Based on an accuracy requirement of a quantum program output, a criticality level of the quantum program may be identified. In addition, a qubit count associated with the quantum program, indicating a number of qubits used to perform quantum processing of the quantum program, may be identified. Based on the identified criticality level and qubit count, an allocation of qubits together with target quantum hardware may be assigned for deploying the quantum program. The target quantum hardware may ingest the quantum program and perform quantum processing of the quantum program.

20 Claims, 14 Drawing Sheets

(56) References Cited

U.S. PATENT DOCUMENTS

| 2018/0181685 | A1 | 6/2018 | Roetteler et al. |
| 2019/0179730 | A1* | 6/2019 | Geller ................. G06F 11/3698 |
| 2020/0134503 | A1 | 4/2020 | Lupton |
| 2020/0167278 | A1 | 5/2020 | Gunnels et al. |
| 2020/0201655 | A1 | 6/2020 | Griffin et al. |
| 2021/0012233 | A1* | 1/2021 | Gambetta ................. G06F 8/44 |
| 2021/0064350 | A1 | 3/2021 | Cao |
| 2021/0124567 | A1* | 4/2021 | Haener .................. G06N 10/20 |
| 2021/0201187 | A1 | 7/2021 | Olivadese et al. |
| 2021/0201189 | A1 | 7/2021 | Gunnels et al. |
| 2021/0272003 | A1 | 9/2021 | Rigetti et al. |
| 2021/0334079 | A1 | 10/2021 | Gambetta et al. |
| 2021/0406151 | A1 | 12/2021 | Durazzo et al. |
| 2022/0084085 | A1 | 3/2022 | Rigetti et al. |
| 2022/0114313 | A1 | 4/2022 | Zhang et al. |
| 2022/0188182 | A1* | 6/2022 | Capelluto .............. G06N 10/40 |
| 2022/0198309 | A1* | 6/2022 | Schoenfeld ........... G06F 16/244 |
| 2022/0366286 | A1* | 11/2022 | Zhang .................... G06N 10/60 |
| 2022/0398099 | A1* | 12/2022 | Willenborg ............ G06N 10/00 |
| 2023/0032530 | A1 | 2/2023 | Naveh et al. |
| 2023/0094508 | A1* | 3/2023 | Resch .................... G06N 10/80 |
| | | | 716/100 |
| 2023/0099621 | A1* | 3/2023 | Shi ......................... G06N 10/80 |
| 2023/0153672 | A1* | 5/2023 | Resch .................. G06F 9/5061 |
| | | | 706/62 |
| 2023/0244973 | A1* | 8/2023 | Naveh .................... G06N 10/20 |
| | | | 706/62 |
| 2023/0409941 | A1* | 12/2023 | Chertkov ................. G06N 5/01 |
| 2024/0028943 | A1* | 1/2024 | Izaac ..................... G06N 10/20 |
| 2024/0078457 | A1 | 3/2024 | Stockert et al. |
| 2024/0086750 | A1* | 3/2024 | Yuan ..................... G06N 10/20 |
| 2024/0160974 | A1 | 5/2024 | Griffin et al. |
| 2024/0249177 | A1* | 7/2024 | Shanmugam Sakthivadivel ......... |
| | | | G06F 8/41 |
| 2024/0281687 | A1* | 8/2024 | Singh .................... G06N 20/00 |
| 2024/0281688 | A1* | 8/2024 | Singh .................... G06Q 40/04 |
| 2024/0338213 | A1* | 10/2024 | Dou .......................... G06F 8/76 |
| 2024/0354615 | A1* | 10/2024 | Singh .................... G06N 20/00 |
| 2025/0225423 | A1* | 7/2025 | Singh ...................... G06F 8/40 |

* cited by examiner

300

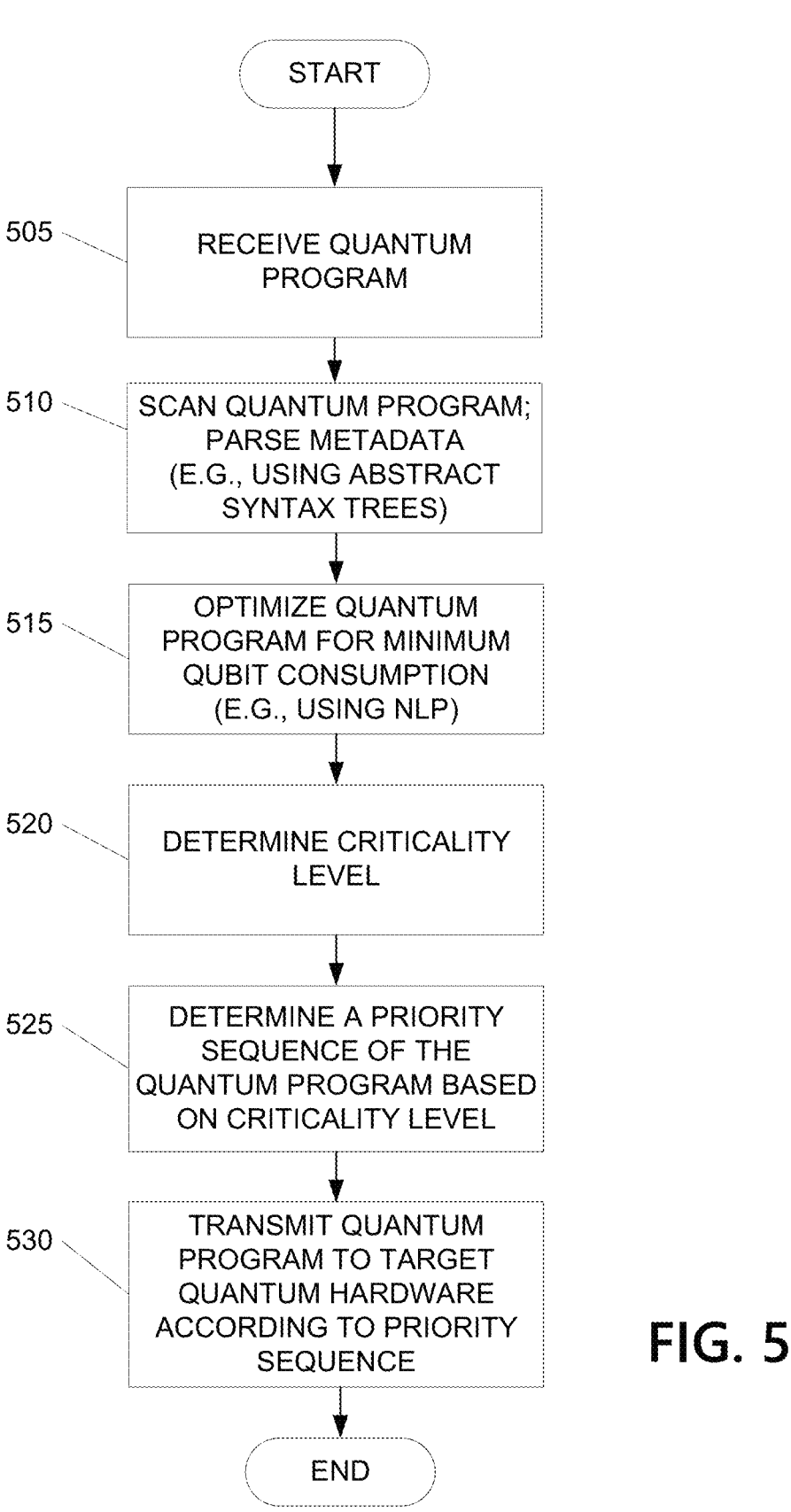

START

505 — RECEIVE QUANTUM PROGRAM

510 — SCAN QUANTUM PROGRAM; PARSE METADATA (E.G., USING ABSTRACT SYNTAX TREES)

515 — OPTIMIZE QUANTUM PROGRAM FOR MINIMUM QUBIT CONSUMPTION (E.G., USING NLP)

520 — DETERMINE CRITICALITY LEVEL

525 — DETERMINE A PRIORITY SEQUENCE OF THE QUANTUM PROGRAM BASED ON CRITICALITY LEVEL

530 — TRANSMIT QUANTUM PROGRAM TO TARGET QUANTUM HARDWARE ACCORDING TO PRIORITY SEQUENCE

END

FIG. 5

INTELLIGENT PROVISIONING OF QUANTUM PROGRAMS TO QUANTUM HARDWARE

BACKGROUND

Aspects of the disclosure generally relate to quantum computers, systems, and devices. In particular, one or more aspects of the disclosure relate to intelligent orchestration of quantum programs to external quantum hardware leveraging non-fungible token (NFT) technology.

Quantum computing provides computational power that many businesses have come to rely on. However, conventional enterprises typically lack quantum hardware due to its infrastructure requirements such as cryogenic cooling and other special equipment for quantum operations. As such, many rely on other enterprises that have the infrastructure in place to provide Quantum as a Service (QaaS), a cloud service that provides customers with access to quantum computing platforms over the internet. Enterprises that provide QaaS often charge based on quantum bit (qubit) consumption. Accordingly, it may be advantageous to have an internal (e.g., in-house) quantum DevOps platform that can support effective deployment of quantum programs to external quantum infrastructure in an optimal manner while ensuring program security and cost effectiveness.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with intelligent orchestration of quantum programs to external quantum hardware leveraging non-fungible token (NFT) technology.

In accordance with one or more embodiments, a computing platform having at least one processor, a communication interface, and memory may receive, from a digital computing device, a quantum program of a plurality of quantum programs to be executed on target quantum hardware. The computing platform may scan and optimize the quantum program for minimum qubit consumption using one or more machine learning models. The computing platform may identify a criticality level of the quantum program. In addition, the criticality level may be based on an accuracy requirement of a quantum program output. The computing platform may identify a qubit count associated with the quantum program. In addition, the qubit count may indicate a number of qubits used to perform quantum processing of the quantum program. Based on the identified criticality level and the identified qubit count associated with the quantum program, the computing platform may assign an allocation of qubits together with specific target quantum hardware, from among a plurality of quantum hardware, for deploying the quantum program. The computing platform may cause the specific target quantum hardware to ingest the quantum program and perform quantum processing of the quantum program.

In some aspects, optimizing the quantum program may include generating and sending, to the digital computing device, one or more code change recommendations for minimizing qubit consumption, and causing the digital computing device to prompt a user of the digital computing device to update the quantum program based on the one or more code change recommendations.

In some embodiments, optimizing the quantum program may include dividing the quantum program into two or more logical portions, including a first logical portion and a second logical portion. In some examples, quantum processing of the first logical portion may be allocated to first target quantum hardware, and quantum processing of the second logical portion may be allocated to second target quantum hardware.

In some example arrangements, the digital computing device may be a computer of a developer writing one or more quantum programs.

In some embodiments, the one or more machine learning models may include one or more of: abstract syntax trees, natural language processing, and clustering.

In some arrangements, the computing platform may create a non-fungible token (NFT) representing the quantum program and associate the NFT with the quantum program. In addition, the NFT may be controlled by smart contract logic associated with a smart contract. Furthermore, the smart contract logic may include predefined acceptance criterion based on which the quantum program output is deployed to the digital computing device.

In some examples, the computing platform may validate a quantum program for the specific target quantum hardware by validating the NFT associated with the quantum program.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 5-7 depict illustrative methods for intelligent orchestration of quantum programs using NFTs in accordance with one or more arrangements discussed herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to intelligent orchestration of quantum programs to external quantum hardware that leverages NFT technology. In particular, one or more aspects of the disclosure may leverage artificial intelligence and/or machine learning (AI/ML) algorithms or models, including abstract syntax trees, to determine contextual logic about a quantum program. Additional aspects of the disclosure may leverage AI/ML algorithms or models, including natural language processing (NLP) to gain insight into code and provide recommendations for modifying quantum program code in a manner that consumes an optimal (e.g., minimum) number of qubits. Additional aspects of the disclosure may, based on understanding contextual and functional logic of a quantum program, determine optimal quantum infrastructure requirements to run the quantum program. Further aspects of the disclosure may mint a non-fungible token representing optimized quantum programs, validate quantum program NFTs, and align quantum programs to target quantum hardware. Further aspects of the disclosure may predefine rules for orchestrating a quantum program link to NFT on quantum hardware. Further aspects of the disclosure may distribute a single quantum program to multiple quantum hardware based on optimization rules. In addition, a single quantum program may have more than one minted NFT for validating a program for respective quantum hardware.

These and various other arrangements will be discussed more fully below.

Figure 1A:
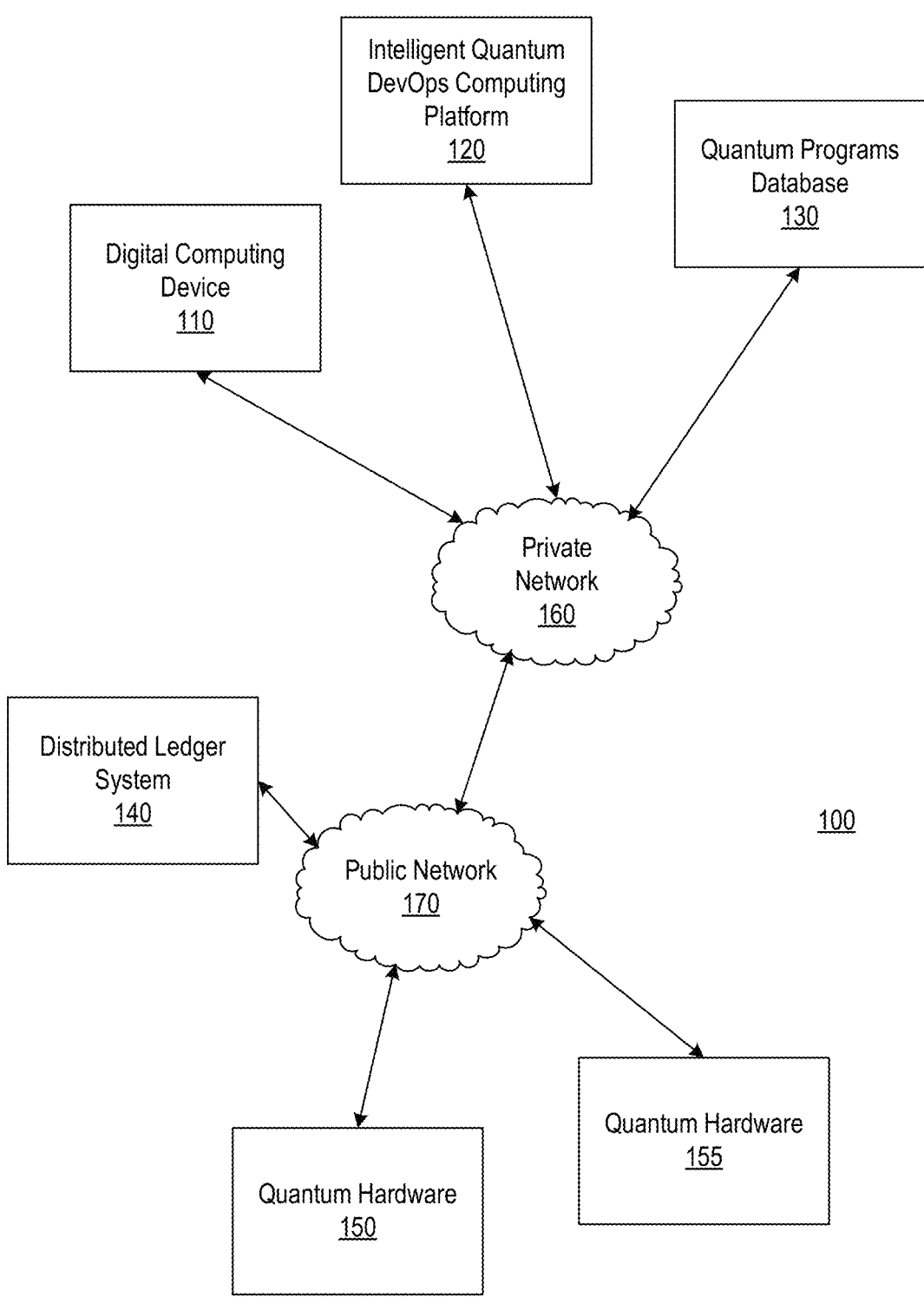
FIGS. 1A and 1B depict an illustrative computing environment for intelligent orchestration of quantum programs using NFTs in accordance with one or more arrangements discussed herein.
Figure 1B:
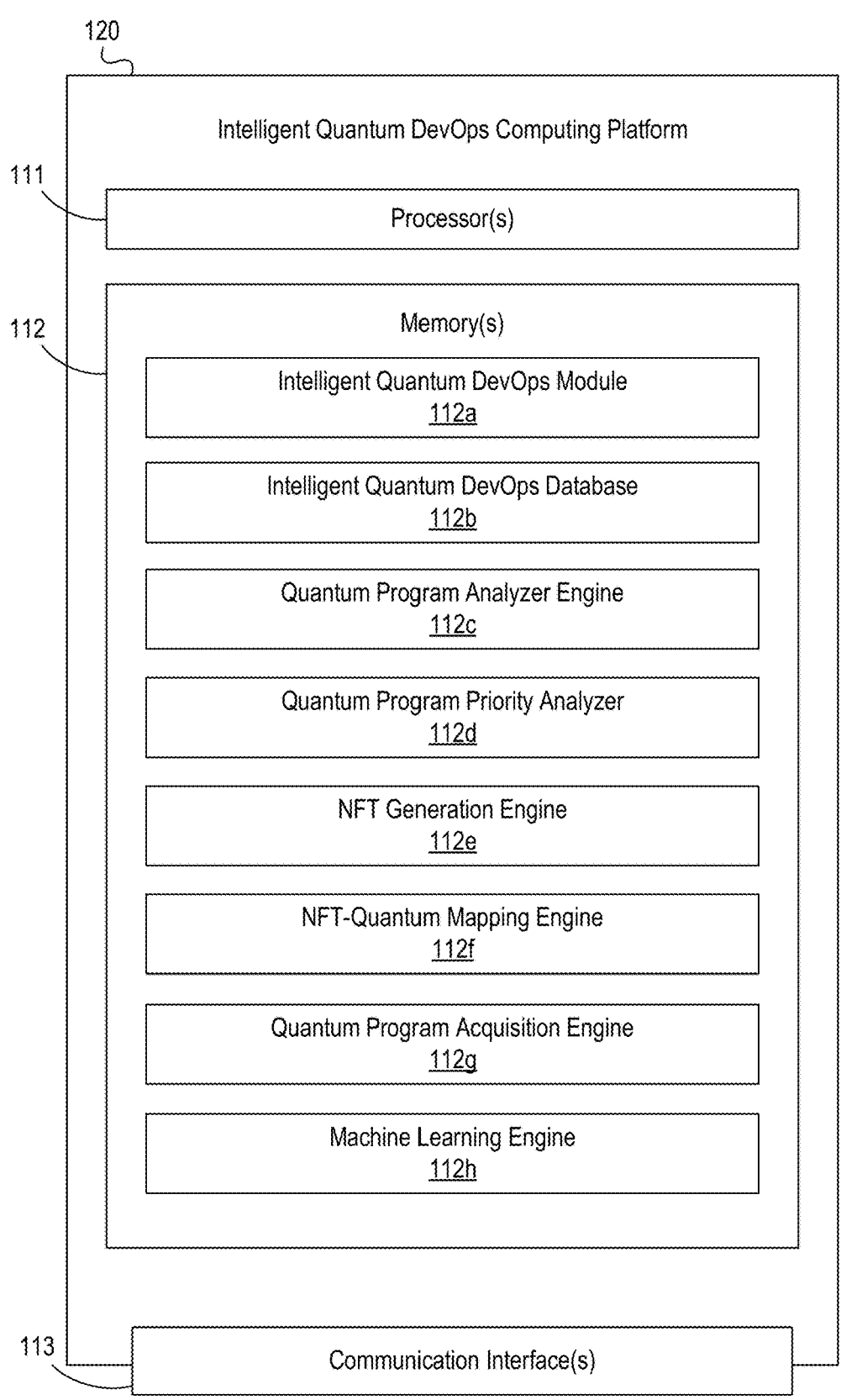

Aspects described herein may be implemented using one or more computing devices operating in a computing environment. For instance, FIGS. 1A and 1B depict an illustrative computing environment for intelligent orchestration of quantum programs using NFTs in accordance with one or more example arrangements. Referring to FIG. 1A, computing environment 100 may include one or more computing devices and/or other computing systems. For example, computing environment 100 may include digital computing device 110, intelligent quantum DevOps computing platform 120, quantum programs database 130, distributed ledger system 140, quantum hardware 150, and/or quantum hardware 155. Although one digital computing device 110, one distributed ledger system 140, and two quantum hardware devices 150, 155 are shown, any number of systems or devices may be used without departing from the invention.

Digital computing device 110 may include one or more computing devices and/or other computer components (e.g., processors, memories, communication interfaces) in a classical computing system. For example, digital computing device 110 may be a desktop computing device (e.g., desktop computer, terminal), or the like or a mobile computing device (e.g., smartphone, tablet, smart watch, laptop computer, or the like) used by developers interacting with intelligent quantum DevOps computing platform 120 and/or quantum programs database 130. In addition, digital computing device 110 may be linked to and/or used by one or more enterprise users (who may, e.g., be employees of an enterprise organization operating the enterprise center where digital computing device 110 is deployed and/or used). For instance, digital computing device 110 may be deployed at an enterprise center, such as the enterprise center where intelligent quantum DevOps computing platform 120 is deployed, so that digital computing device 110 may be used by one or more employees of an enterprise organization operating the enterprise center when such employees are facilitating enterprise software development efforts.

Intelligent quantum DevOps computing platform 120 may be configured to perform intelligent, dynamic, and efficient orchestration of quantum programs to external quantum hardware leveraging NFTs. In some examples, intelligent quantum DevOps computing platform 120 may be an intermediary layer between digital/classical computing and quantum computing infrastructures configured to act as a continuous integration and continuation deployment (CI/CD) tool that orchestrates quantum programs to external quantum hardware in a secure and efficient manner. For example, a program written via a digital/classical computing device (e.g., digital computing device 110) may be routed through intelligent quantum DevOps computing platform 120. Through that CI/CD channel, the program may interact with quantum hardware (e.g., quantum hardware 150, quantum hardware 155). In some aspects, intelligent quantum DevOps computing platform 120 may perform optimizations (e.g., optimizing qubit usage), determine prioritization of quantum programs, perform dynamic optimal quantum hardware provisioning and/or perform other functions, as discussed in greater detail below. Among other functions, intelligent quantum DevOps computing platform 120 ensures that where the quantum program is deployed will produce optimal results.

Quantum programs database 130 may include one or more computing devices and/or other computer components (e.g., processors, memories, communication interfaces) that may store source code for quantum computing. Quantum programs database 130 may include distinct and physically separate data centers or other groupings of server computers that are operated by and/or otherwise associated with an organization, such as a financial institution. In some examples, quantum programs database 130 may include all code to execute one or more quantum programs. In some examples, quantum programs database 130 may be a code hosting platform for version control and collaboration. For instance, quantum programs database 130 may allow developers to continuously make code changes, and the modified code may be integrated into the repository. In addition, and as illustrated in greater detail below, quantum programs database 130 may be configured to receive information from, send information to, and/or otherwise exchange information with one or more devices as described herein.

Distributed ledger system 140 may be or include one or more computing devices or systems (e.g., servers, server blades, or the like) including one or more computer components (e.g., processors, memory, or the like) hosting a distributed ledger (e.g., blockchain, Holochain, or the like). The distributed ledger system 140 may be a public blockchain or may be a private blockchain hosted by or associated with the enterprise organization.

Quantum hardware 150, 155 may include one or more quantum computing devices and/or other computer components in a quantum computing system (e.g., quantum bit processor, superconducting circuits, quantum memory, or the like) operated by an external (e.g., third party) enterprise organization. Quantum hardware 150, 155 may be associated with quantum computing systems of one or more quantum computing companies or companies that offer quantum computing technologies/services (e.g., QaaS).

As mentioned above, computing environment 100 also may include one or more networks, which may interconnect one or more of digital computing device 110, intelligent quantum DevOps computing platform 120, quantum programs database 130, distributed ledger system 140, quantum hardware 150, and/or quantum hardware 15. For example, computing environment 100 may include private network 160 and public network 170. Private network 160 and/or public network 170 may include one or more sub-networks (e.g., Local Area Networks (LANs), Wide Area Networks (WANs), or the like). Private network 160 may be associated with a particular organization (e.g., a corporation, financial institution, educational institution, governmental institution, or the like) and may interconnect one or more computing devices associated with the organization. For example, digital computing device 110, intelligent quantum DevOps computing platform 120, and/or quantum programs database 130, may be associated with an enterprise organization (e.g., a financial institution), and private network 160 may be associated with and/or operated by the organization, and may include one or more networks (e.g., LANs, WANs, virtual private networks (VPNs), or the like) that interconnect digital computing device 110, intelligent quantum DevOps computing platform 120, and/or quantum programs database 130, and one or more other computing devices and/or computer systems that are used by, operated by, and/or otherwise associated with the organization. Public network 170 may connect private network 160 and/or one or more computing devices connected thereto (e.g., digital computing device 110, intelligent quantum DevOps computing platform 120, quantum programs database 130) with one or more networks and/or computing devices that are not associated with the organization. For example, distributed ledger system 140, quantum hardware 150 and/or quantum hardware 155, might not be associated with an organization that operates private network 160 (e.g., because distributed ledger system 140, quantum hardware 150 and/or quantum hardware 155 may be owned, operated, and/or serviced by one or more entities different from the organization that operates private network 160, one or more customers of the organization, one or more employees of the organization, public or government entities, and/or vendors of the organization, rather than being owned and/or operated by the organization itself), and public network 170 may include one or more networks (e.g., the internet) that connect distributed ledger system 140, quantum hardware 150 and/or quantum hardware 155 to private network 160 and/or one or more computing devices connected thereto (e.g., digital computing device 110, intelligent quantum DevOps computing platform 120, and/or quantum programs database 130).

Referring to FIG. 1B, intelligent quantum DevOps computing platform 120 may include one or more processors 111, memory 112, and communication interface 113. A data bus may interconnect processor(s) 111, memory 112, and communication interface 113. Communication interface 113 may be a network interface configured to support communication between intelligent quantum DevOps computing platform 120 and one or more networks (e.g., private network 160, public network 170, or the like). Memory 112 may include one or more program modules having instructions that when executed by processor(s) 111 cause intelligent quantum DevOps computing platform 120 to perform one or more functions described herein and/or one or more databases that may store and/or otherwise maintain information which may be used by such program modules and/or processor(s) 111. In some instances, the one or more program modules and/or databases may be stored by and/or maintained in different memory units of intelligent quantum DevOps computing platform 120 and/or by different computing devices that may form and/or otherwise make up intelligent quantum DevOps computing platform 120.

For example, memory 112 may have, store and/or include an intelligent quantum DevOps module 112a, an intelligent quantum DevOps database 112b, a quantum program analyzer engine 112c, a quantum program priority analyzer 112d, an NFT generation engine 112e, an NFT-quantum mapping engine 112f, a quantum program acquisition engine 112g, and a machine learning engine 112h.

Intelligent quantum DevOps module 112a, may have instructions that direct and/or cause intelligent quantum DevOps computing platform 120 to, for instance, optimize qubit consumption of quantum programs, intelligently provision quantum programs to quantum hardware, intelligently orchestrate quantum programs using smart contracts linked to quantum program NFTs, and/or instructions that direct intelligent quantum DevOps computing platform 120 to perform other functions, as discussed in greater detail below. Intelligent quantum DevOps database 112b may store information used by intelligent quantum DevOps module 112a and/or intelligent quantum DevOps computing platform 120 in linking quantum programs to NFTs and/or in performing other functions, as discussed in greater detail below.

Quantum program analyzer engine 112c may be communicatively coupled to a deep learning system/engine (e.g., machine learning engine 112h). Quantum program analyzer engine 112c may scan a quantum program at run time while a programmer is writing a program or once a program is compiled, and use an artificial intelligence and/or machine learning (AI/ML) method such as natural language processing (NLP) or abstract syntax trees (AST) to understand the functionality of the quantum program. Quantum program analyzer engine 112c may be a cognitive engine that may recognize if a programmer is writing a program that is consuming an undesirable number of qubits (e.g., more qubits than necessary). In some examples, quantum program analyzer engine 112c may provide one or more recommendations for modifying the program for optimal qubit usage (e.g., to minimize qubit consumption). In some examples, quantum program analyzer engine 112c may bifurcate or divide a quantum program into groups or clusters to optimize qubit usage. In addition, each logical group or portion may be minted as an NFT.

Quantum program priority analyzer 112d may assign priority to quantum program NFTs. Once a program is optimized, the quantum program priority analyzer 112d may determine target quantum hardware into which the program should be pushed (e.g., to achieve quantum program output with a desired accuracy).

NFT generation engine 112e may mint one or more NFTs for a quantum program based on complexity of the quantum program and/or qubit optimization rules. NFT generation engine 112e may convert a quantum program into an NFT token linked to particular hardware.

NFT-quantum mapping engine 112f may be and/or include an NFT wallet that maps each NFT to an associated quantum program. In some instances, NFT-quantum mapping engine 112f may include chains of NFTs for a single program (e.g., a single program that has been bifurcated or divided). In addition, NFT-quantum mapping engine 112f may align quantum program NFTs with quantum hardware (e.g., identify which NFT is validated by which quantum hardware). For instance, a first NFT may be aligned with first quantum hardware, a second NFT may be aligned with second quantum hardware, etc.

Quantum program acquisition engine 112g may validate quantum programs by validating quantum NFTs, enabling quantum hardware to acquire/ingest quantum programs that are the target to their quantum machine/infrastructure. For instance, based on NFT-quantum mapping engine 112*f* aligning quantum program NFTs with quantum hardware, quantum program acquisition engine 112*g* may validate those NFTs and begin pulling quantum programs to the quantum hardware. Once the quantum hardware provides an output of quantum processing based on smart contract rules/logic, quantum program acquisition engine 112*g* may deploy the output into a digital computing infrastructure (e.g., to digital computing device 110) and consumed for a business or other purpose.

Machine learning engine 112*h* may use AI/ML algorithms to scan a quantum program and prioritize the quantum program based on qubit usage and/or functional logic context. In some examples, the AI/ML algorithm may include NLP, ASTs, clustering, and/or the like. Machine learning engine 112*h* may have instructions that direct and/or cause intelligent quantum DevOps computing platform 120 to set, define, and/or iteratively redefine rules, techniques and/or other parameters used by intelligent quantum DevOps computing platform 120 and/or other systems in computing environment 100 in understanding the functionality of quantum programs, in recommending or suggesting modifications to program code for optimal (e.g., minimum) qubit consumption, and/or in automatically modifying program code based on qubit optimization requirements. In some examples, intelligent quantum DevOps computing platform 120 may build and/or train one or more machine learning models. For example, memory 112 may have, store, and/or include historical/training data. In some examples, intelligent quantum DevOps computing platform 120 may receive historical and/or training data and use that data to train one or more machine learning models stored in machine learning engine 112*h*. The historical and/or training data may include, for instance, contextual information about a program, qubit consumption/usage information such as how many qubits each component in a quantum program will consume, and/or the like. The data may be gathered and used to build and train one or more machine learning models executed by machine learning engine 112*h* to identify qubit usage of one or more portions of code, intelligently generate code modification recommendations in accordance with the identified qubit usage, and/or perform other functions, as discussed in greater detail below. Various machine learning algorithms may be used without departing from the disclosure, such as supervised learning algorithms, unsupervised learning algorithms, abstract syntax tree algorithms, natural language processing algorithms, clustering algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, artificial neural network algorithms, and the like. Additional or alternative machine learning algorithms may be used without departing from the disclosure.

FIGS. 2A-2G depict one example illustrative event sequence for intelligent orchestration of quantum programs using NFTs in accordance with one or more aspects described herein. The events shown in the illustrative event sequence are merely one example sequence and additional events may be added, or events may be omitted, without departing from the invention. Further, one or more processes discussed with respect to FIGS. 2A-2G may be performed in real-time or near real-time.

Figure 2A:
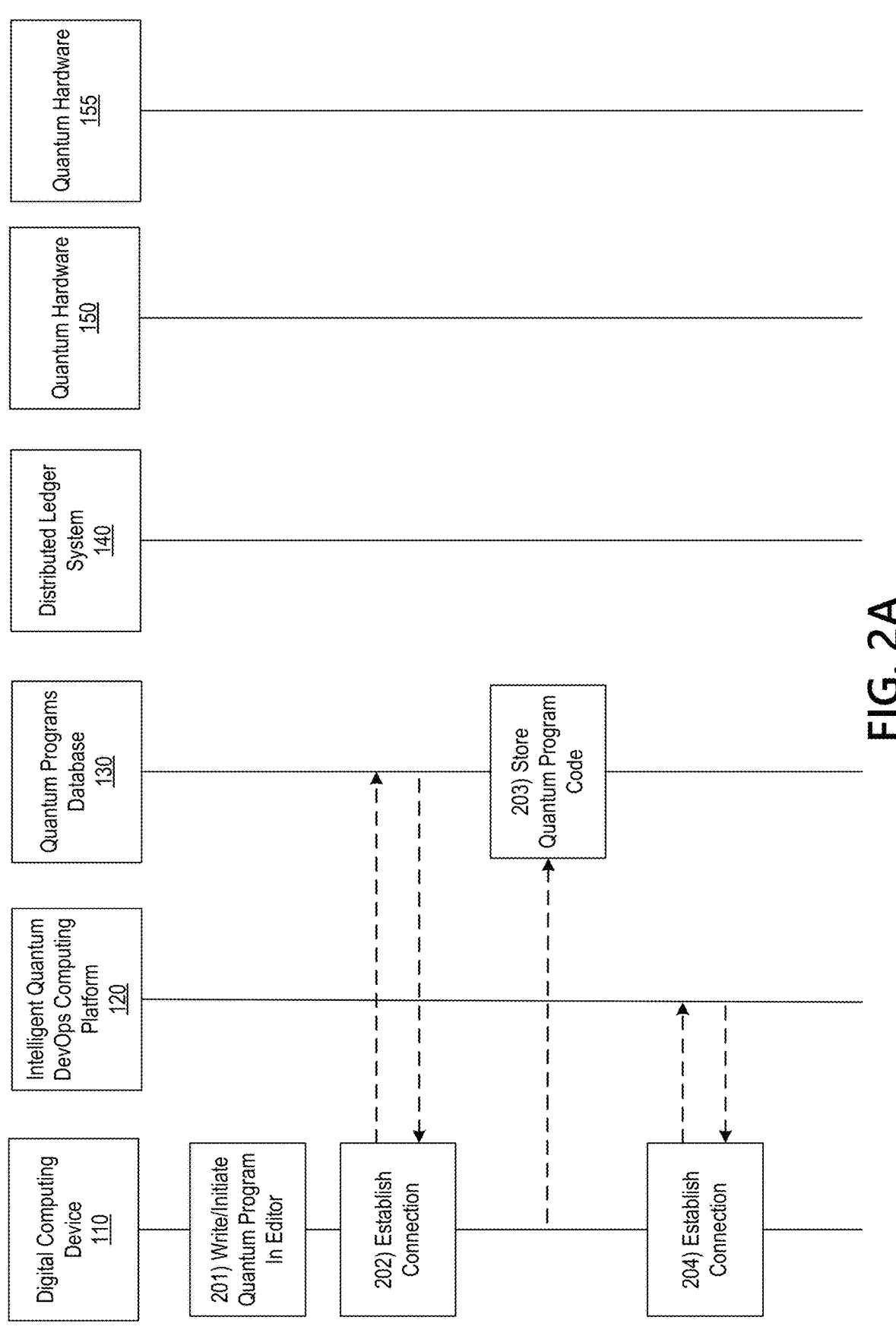
FIGS. 2A-2G depict an illustrative event sequence for intelligent orchestration of quantum programs using NFTs in accordance with one or more arrangements discussed herein.

With reference to FIG. 2A, at step 201, a user (e.g., a programmer or developer) of a digital computing device (e.g., digital computing device 110) may write/initiate one or more quantum programs (e.g., using a program editor). In some examples, different development teams might write different programs (e.g., on a distributed computing network).

At step 202, digital computing device 110 may connect to quantum programs database 130. For instance, a first wireless connection may be established between digital computing device 110 and quantum programs database 130. Upon establishing the first wireless connection, a communication session may be initiated between digital computing device 110 and quantum programs database 130. At step 203, the program code may be sent to the quantum programs database 130 and quantum programs database 130 may store the program code.

At step 204, digital computing device 110 may connect to intelligent quantum DevOps computing platform 120. For instance, a second wireless connection may be established between digital computing device 110 and intelligent quantum DevOps computing platform 120. Upon establishing the second wireless connection, a communication session may be initiated between digital computing device 110 and intelligent quantum DevOps computing platform 120.

Figure 2B:
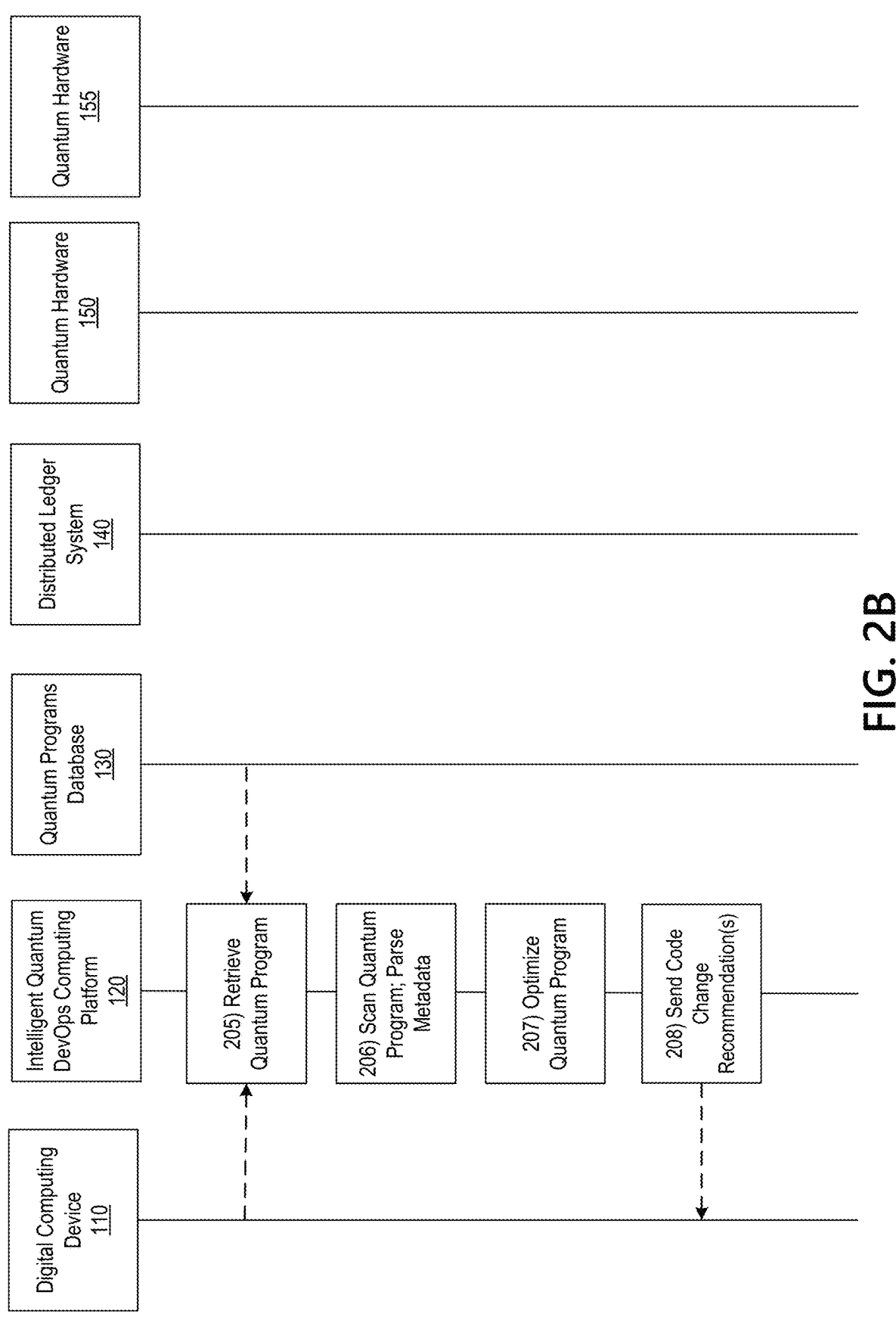

With reference to FIG. 2B, at step 205, intelligent quantum DevOps computing platform 120 may retrieve, receive, or otherwise acquire a quantum program. In some examples, the quantum program may be retrieved from the digital computing device (e.g., digital computing device 110) of a developer initiating the quantum program in an editor. In some examples, the quantum program may be retrieved by accessing the quantum program from a repository (e.g., quantum programs database 130).

At step 206, intelligent quantum DevOps computing platform 120 may scan the quantum program and parse metadata associated with the quantum program using one or more artificial intelligence or machine learning models. Intelligent quantum DevOps computing platform 120 may scan the quantum program at runtime (e.g., while a programmer is writing the program). Alternatively, intelligent quantum DevOps computing platform 120 may scan the quantum program at compile time (e.g., once the program is compiled). In some examples, intelligent quantum DevOps computing platform 120 may parse metadata associated with the quantum program using abstract syntax trees (e.g., a collection of nodes which are linked together in a tree fashion and include structure information within them for understanding the programming code), natural language processing (e.g., producing machine representations of text so that machines can search such representations for patterns), and/or clustering techniques (e.g., grouping source code by similarities). The metadata may define contextual logic of the quantum program (e.g., information and context about code or a specific function). For instance, the metadata associated with the quantum program may include a domain name, a task name, program details, qubit quantity information, target quantum hardware information, priority sequence information, and/or the like. Other suitable techniques for determining contextual logic or functionality of a quantum program may be used without departing from the scope of the present disclosure.

At step 207, intelligent quantum DevOps computing platform 120 may optimize the quantum program by modifying program code of the quantum program for minimum qubit consumption. In some example embodiments, intelligent quantum DevOps computing platform 120 may automatically modify/edit the program code of the quantum program for minimum qubit consumption without manual intervention. For instance, using one or more machine learning models (e.g., abstract syntax trees, natural language processing, clustering, and/or the like), intelligent quantum DevOps computing platform 120 may automatically modify the program code of the quantum program to consume fewer qubits as compared to a number of qubits consumed by the quantum program before the optimization. In some embodiments, in optimizing the quantum program, intelligent quantum DevOps computing platform 120 may divide the quantum program into two or more logical portions, including a first logical portion and a second logical portion.

Additionally or alternatively, in some embodiments, at step 208, intelligent quantum DevOps computing platform 120 may generate and send, to the digital computing device of the user (e.g., digital computing device 110), one or more code change recommendations for minimizing qubit consumption. For instance, the one or more code change recommendations may be sent during the communication session initiated upon establishing the second wireless connection.

Figure 2C:
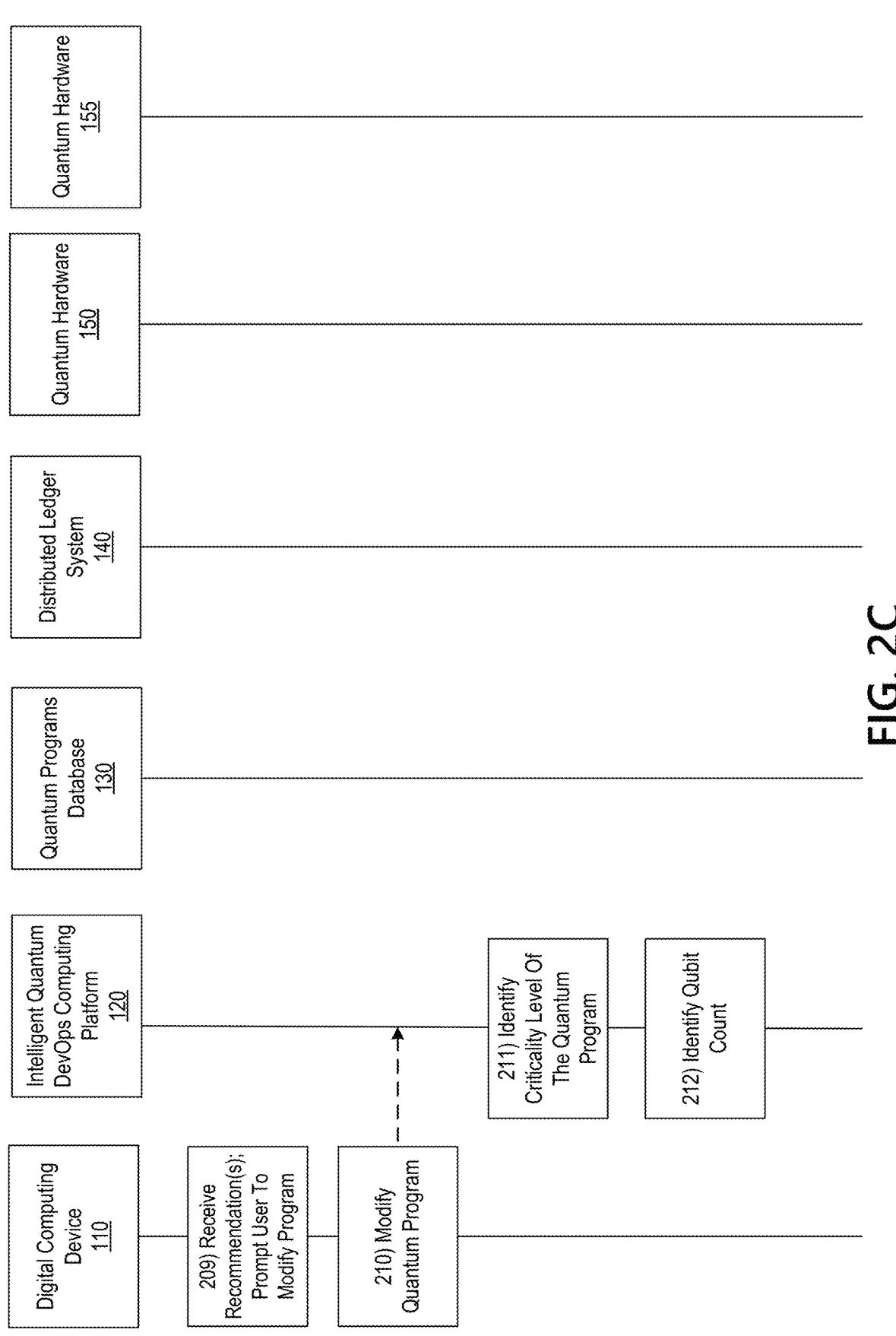
Figure 3:
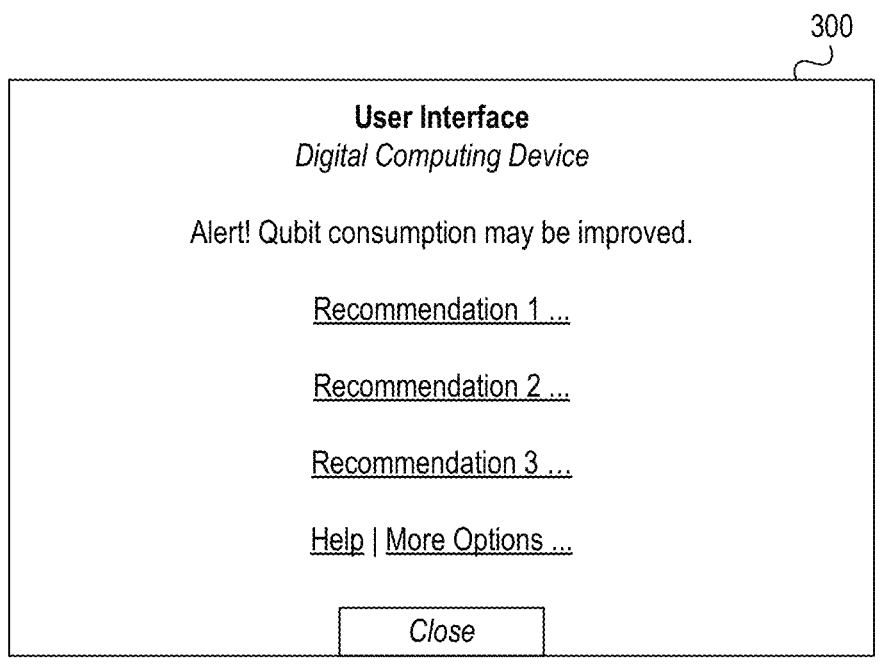
FIG. 3 depicts an example graphical user interface for intelligent orchestration of quantum programs using NFTs in accordance with one or more arrangements discussed herein.

With reference to FIG. 2C, at step 209, the digital computing device (e.g., digital computing device 110) may receive the one or more code change recommendations and prompt a user of the digital computing device (e.g., digital computing device 110) to modify/update the quantum program based on the one or more code change recommendations. In some embodiments, the digital computing device (e.g., digital computing device 110) may receive, in real-time, as the user is writing or creating a program in an editor and compilation is occurring in parallel, the suggestions for modifying or optimizing the quantum program. For instance, a program might be consuming 10 qubits, but intelligent quantum DevOps computing platform 120 might suggest that a programmer apply alternate logic or introduce alternate components into the program such that fewer qubits are consumed (e.g., 8 qubits versus 10 qubits). For instance, the digital computing device (e.g., digital computing device 110) may display and/or otherwise present one or more graphical user interfaces similar to graphical user interface 300, which is illustrated in FIG. 3. As seen in FIG. 3, graphical user interface 300 may include text and/or other information associated with providing code change recommendations, including one or more user-selectable options that allow a user to select from one or more recommendations for minimizing qubit consumption (e.g., "Alert! Qubit consumption may be improved. [Recommendation 1 . . . ] [Recommendation 2 . . . ] [Recommendation 3 . . . ]"). It will be appreciated that other and/or different notifications may also be provided.

In turn, at step 210, the user of the digital computing device (e.g., digital computing device 110) may modify/update the quantum program based on the one or more code change recommendations and send the updated quantum program to intelligent quantum DevOps computing platform 120.

At step 211, intelligent quantum DevOps computing platform 120 may determine or identify a criticality level of the quantum program based on the contextual logic associated with the quantum program. A criticality level generally refers to the consequences of incorrect output of a system. The more serious the direct and indirect effects of an incorrect output, the higher the criticality level. For instance, the criticality level of the quantum program may be determined based on an accuracy requirement of a quantum program output. A quantum program that requires relatively accurate results, therefore, may be assigned a relatively high criticality level, while an output causing a relatively lower impact to an organization or system may be assigned a relatively lower criticality level.

At step 212, intelligent quantum DevOps computing platform 120 may determine or identify a qubit count associated with the quantum program. The qubit count may indicate a number of qubits used to perform quantum processing of the quantum program.

Figure 2D:
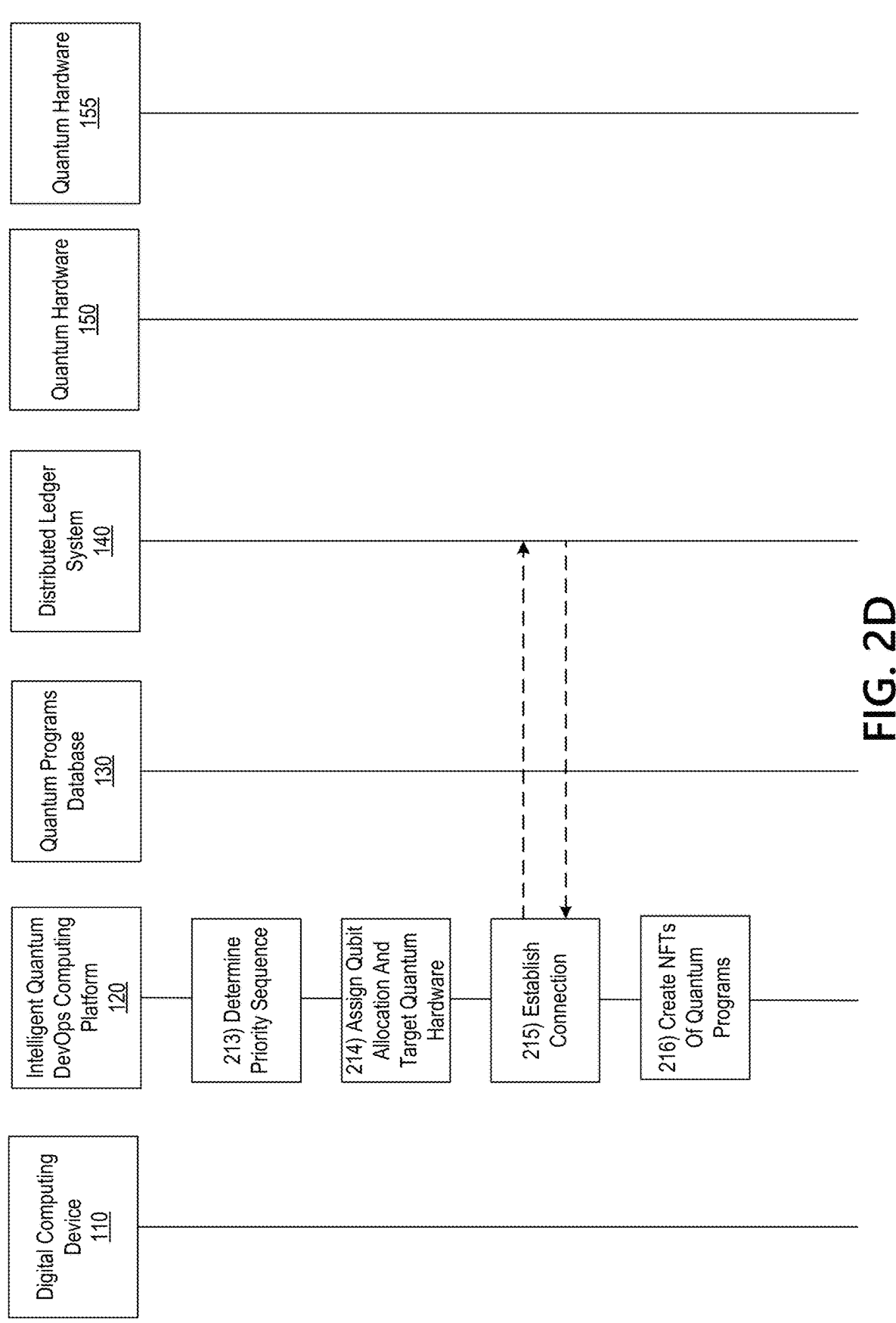

With reference to FIG. 2D, at step 213, intelligent quantum DevOps computing platform 120 may, based on the criticality level and/or the qubit count associated with the quantum program, determine a priority sequence of the quantum program. The priority sequence may indicate an order in which the plurality of quantum programs are to be deployed to the target quantum hardware. At step 214, intelligent quantum DevOps computing platform 120 may, based on the criticality level and/or the qubit count associated with the quantum program, assign or designate an allocation of qubits together with specific target quantum hardware, from among a plurality of quantum hardware, for deploying the quantum program (e.g., align quantum programs to target quantum hardware).

Example quantum use cases for quantum computing might include an API cache optimization quantum program, a portfolio optimization quantum program, a Know Your Customer (KYC) search optimization quantum program, a data modeling simulation quantum program, a quantum key distribution (QKD) program, an unauthorized activity detection quantum program, a loan assessment quantum program, or the like.

In one instance, a user of a digital computing device (e.g., digital computing device 110) developing an unauthorized activity detection model to detect unauthorized activity might wish to expedite results using quantum computing (e.g., using a quantum hardware 150, 155). Based on the critical nature of unauthorized activity detection, intelligent quantum DevOps computing platform 120 might assign specific/optimal quantum target hardware for running the unauthorized activity detection program which will produce the highest accuracy (e.g., lowest percentage of processing error) among available quantum hardware. In another instance, a user of a digital computing device (e.g., digital computing device 110) developing a loan assessment model to predict whether a customer will repay a loan might wish to expedite results using quantum computing (e.g., using a quantum hardware 150, 155). Based on the non-critical or less critical nature of loan assessment as compared to unauthorized activity detection, intelligent quantum DevOps computing platform 120 might assign default quantum hardware for running the loan assessment program, even if the default quantum hardware produces relatively lower accuracy rates (e.g., a higher percentage of processing error) as compared to other quantum hardware.

At step 215, intelligent quantum DevOps computing platform 120 may connect to distributed ledger system 140. For instance, a third wireless connection may be established between intelligent quantum DevOps computing platform 120 and distributed ledger system 140. Upon establishing the third wireless connection, a communication session may be initiated between intelligent quantum DevOps computing platform 120 and distributed ledger system 140.

At step 216, intelligent quantum DevOps computing platform 120 may create non-fungible tokens (NFTs) representing each of the plurality of quantum programs (e.g., optimized quantum programs). The NFT certifies a digital asset (e.g., the quantum program) to be unique and authentic using a cryptographic hash. The NFT is a unique digital identifier that cannot be copied, substituted or subdivided.

Figure 2E:
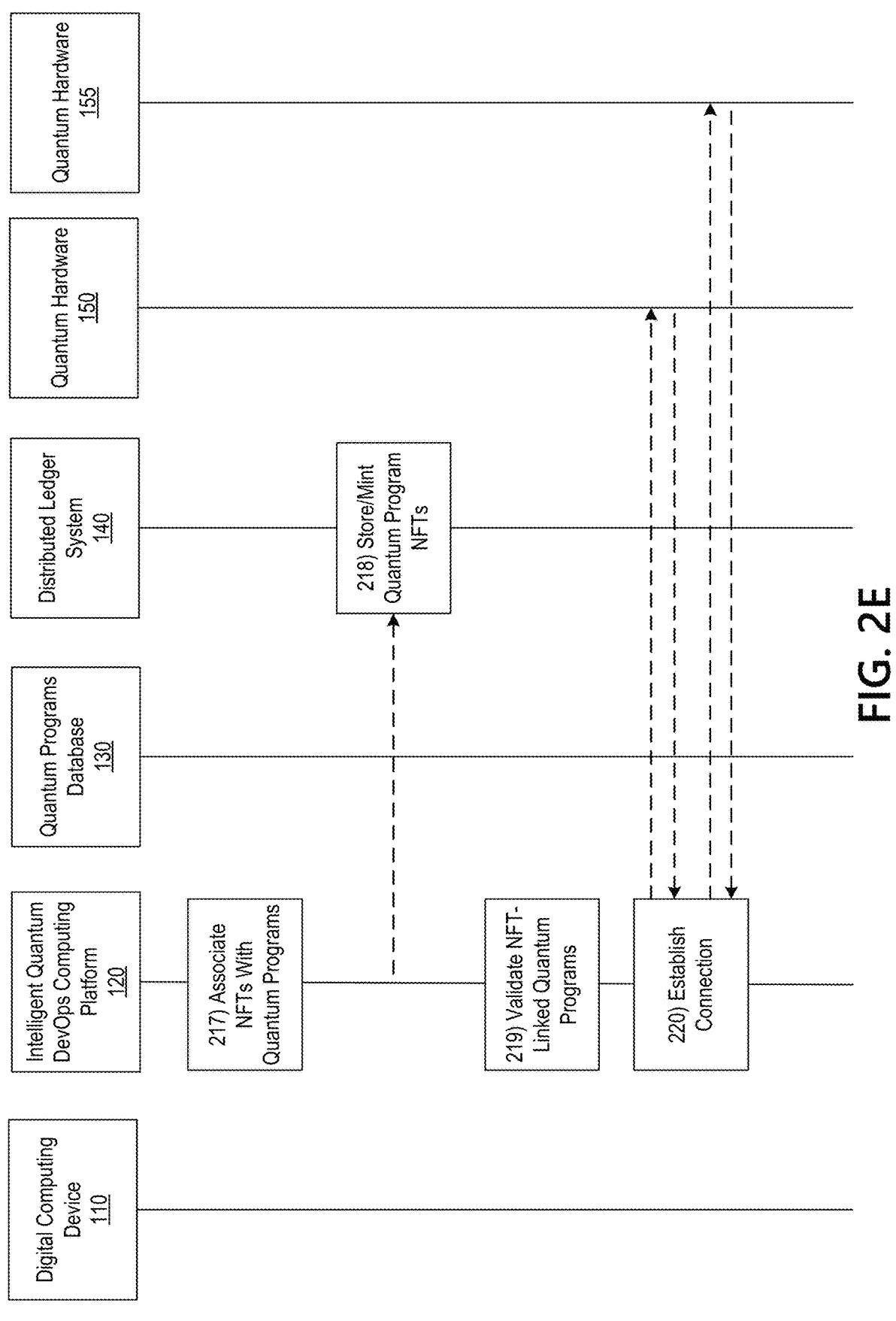

With reference to FIG. 2E, at step 217, intelligent quantum DevOps computing platform 120 may associate or link each of the NFTs with a respective one of the plurality of quantum programs. In addition, each of the NFTs may be controlled by smart contract logic associated with a smart contract. The smart contract may predefine rules based on which a quantum program NFT is controlled or managed. For example, the smart contract may define validation rules based on which the output of a quantum program is deployed to a digital computing infrastructure (e.g., digital computing device 110). In some examples, the smart contract logic includes a predefined acceptance criterion or rules (e.g., an acceptable percentage of error) based on which a quantum processing output is deployed to the digital computing device.

Figure 4:
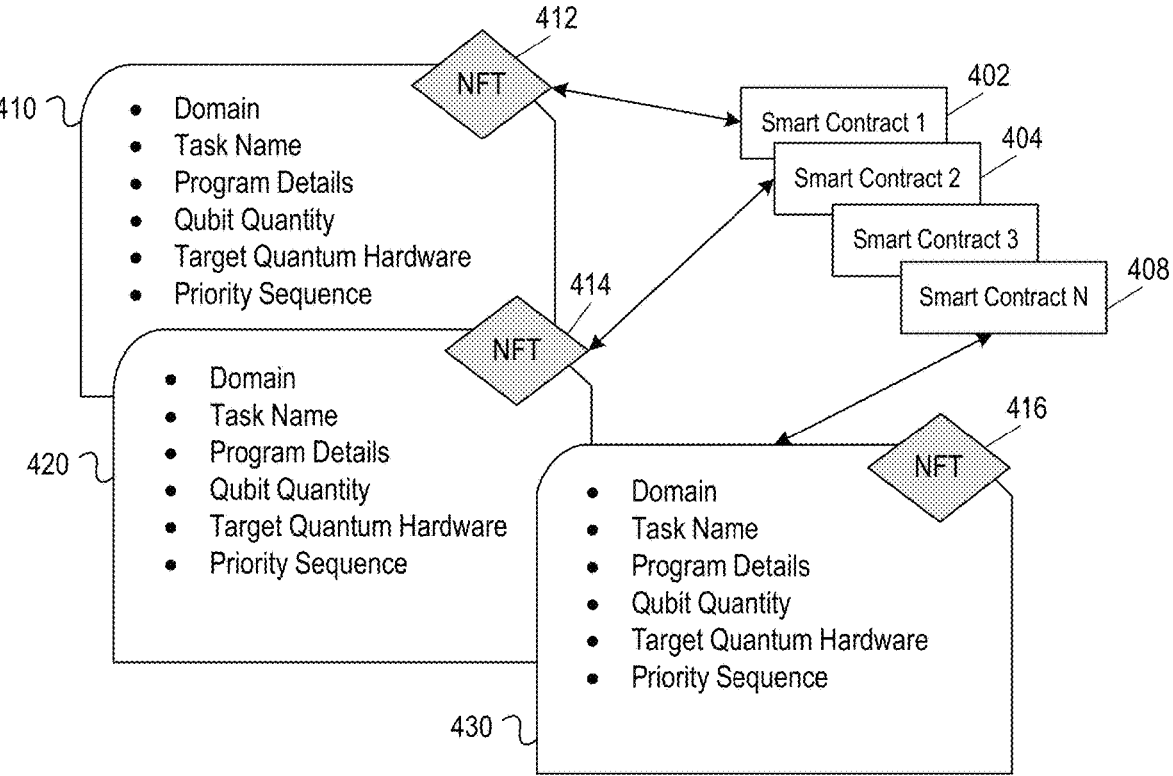
FIG. 4 depicts simplified diagram of NFT-tagged quantum programs in accordance with one or more arrangements discussed herein.

FIG. 4 depicts a simplified diagram for intelligent orchestration of quantum programs using NFTs in accordance with one or more example embodiments. For example, FIG. 4 illustrates example quantum programs 410, 420, 430 tagged with respective NFTs 412, 414, 416, and each of those NFTs 412, 414, 416 may be controlled by smart contract logic of smart contracts 402, 404, 408.

Returning to FIG. 2E, at step 218, intelligent quantum DevOps computing platform 120 may receive the NFTs generated at step 216 and store or mint the NFTs (e.g., NFTs linked to the quantum programs) as a block in a distributed ledger (e.g., blockchain, or the like). For example, each NFT may be an identifiable data block stored on the blockchain to certify that the quantum program is authentic. Because the ownership of the NFT is stored on a distributed ledger, it cannot be tampered with or stolen, thereby ensuring proof of ownership of the quantum program.

At step 219, intelligent quantum DevOps computing platform 120 may validate a quantum program of the plurality quantum programs for respective target quantum hardware by validating the NFT associated with the quantum program. The NFT associated with the quantum program may include metadata associated with the quantum program. For example, the associated metadata may include a domain name (e.g., identifying a program for information security, a program for encryption, etc.), a task name (e.g., identifying what a program does), program details, qubit quantity information (e.g., a number of qubits that a program or a portion of a program consumes), target quantum hardware information, priority sequence information of the quantum program (e.g., identifying which program should be deployed first, and on which hardware), and/or the like.

At step 220, intelligent quantum DevOps computing platform 120 may connect to quantum hardware 150, 155. For instance, a fourth and fifth wireless connection may be established between intelligent quantum DevOps computing platform 120 and external quantum hardware (e.g., quantum hardware 150, quantum hardware 155). Upon establishing the fourth and fifth wireless connection, a communication session may be initiated between intelligent quantum DevOps computing platform 120 and external quantum hardware (e.g., quantum hardware 150, quantum hardware 155).

Figure 2F:
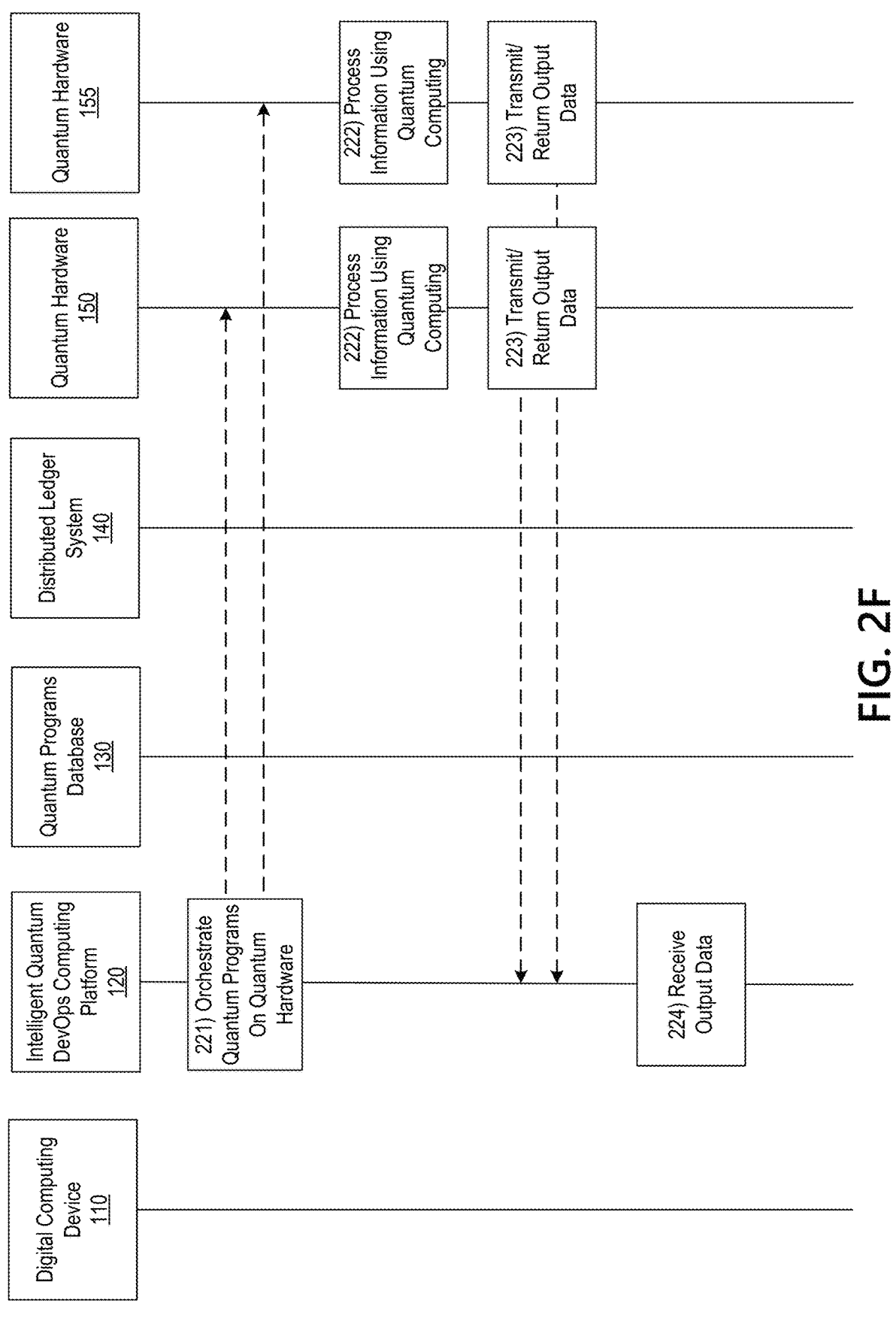

With reference to FIG. 2F, at step 221, intelligent quantum DevOps computing platform 120 may orchestrate quantum programs for execution on target quantum hardware (e.g., push quantum programs into quantum hardware). For instance, intelligent quantum DevOps computing platform 120 may cause the respective target quantum hardware to ingest the validated quantum program and perform quantum processing of the validated quantum program. In some examples, intelligent quantum DevOps computing platform

120 may push/transmit the quantum program to the target quantum hardware according to a determined priority sequence (e.g., from step 213). In the case of a divided quantum program, each logical portion of the divided quantum program may be associated with a corresponding NFT, and quantum processing of a first logical portion may be allocated to first target quantum hardware (e.g., quantum hardware 150), while quantum processing of a second logical portion may be allocated to second target quantum hardware (e.g., quantum hardware 155). At step 222, quantum hardware 150 and/or quantum hardware 155 may process information based on quantum computing. At step 223, the quantum hardware (e.g., quantum hardware 150 and/or quantum hardware 155) may transmit or return output of the quantum processing to intelligent quantum DevOps computing platform 120. At step 224, intelligent quantum DevOps computing platform 120 may receive the output of the quantum processing.

Figure 2G:
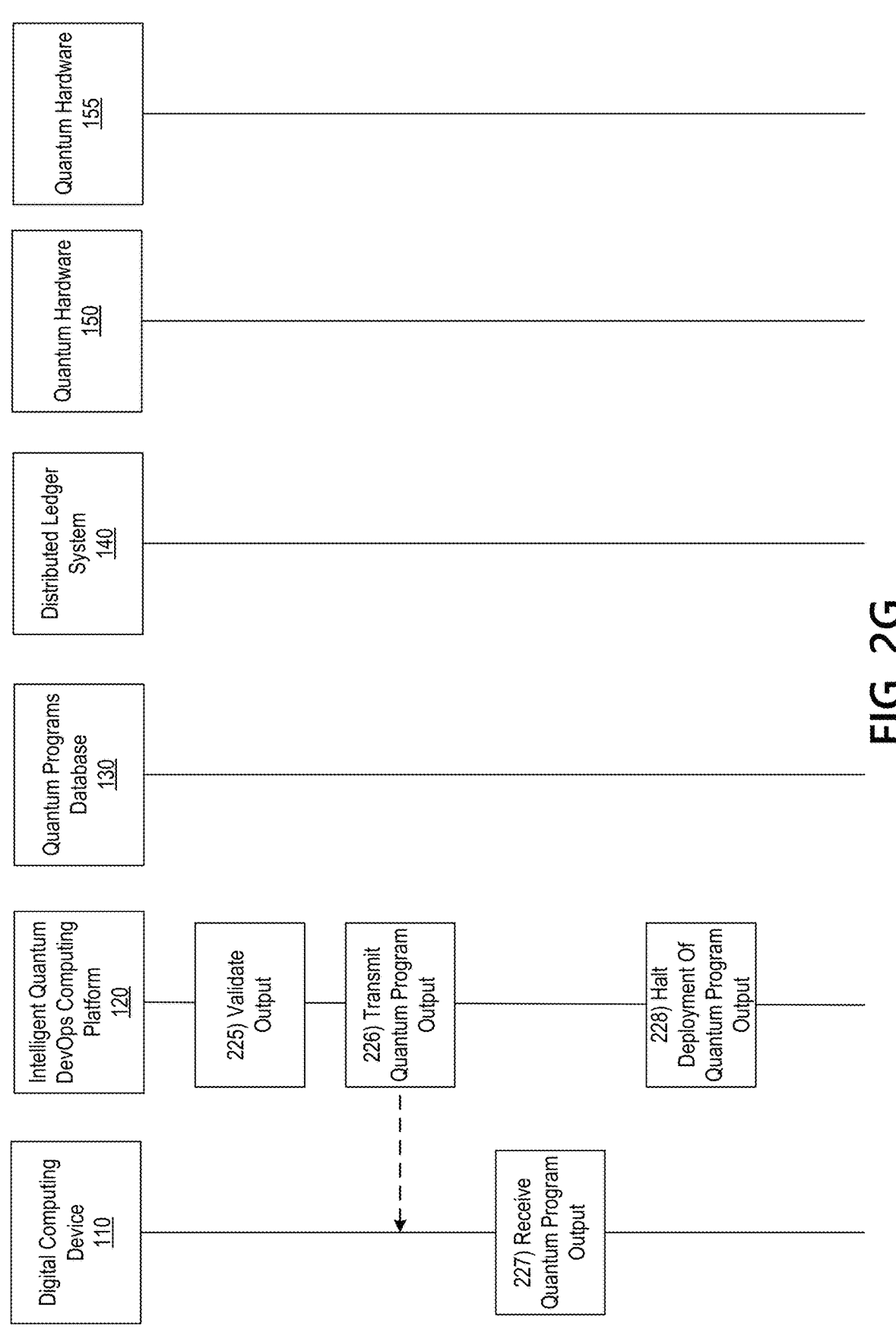

With reference to FIG. 2G, at step 225, intelligent quantum DevOps computing platform 120 may perform predeployment validations. For instance, using the smart contract logic associated with the smart contract for the respective NFT, determine whether the output of quantum processing meets the predefined acceptance criterion of the smart contract (e.g., a quantum processing error being less than 10%). At step 226, responsive to determining the output of quantum processing meets the predefined acceptance criterion of the smart contract (e.g., a quantum processing error being less than 10%), intelligent quantum DevOps computing platform 120 may deploy or transmit the output of the quantum processing in the digital computing device (e.g., digital computing device 110). In turn, at step 227, the digital computing device (e.g., digital computing device 110) may receive and consume the output of the quantum processing.

At step 228, responsive to determining the output of quantum processing does not meet the predefined acceptance criterion of the smart contract (e.g., a quantum processing error being greater than 10%), intelligent quantum DevOps computing platform 120 may halt deployment of the output of the quantum processing to the digital computing device (e.g., digital computing device 110).

FIG. 5 depicts an illustrative method for intelligent orchestration of quantum programs using NFTs in accordance with one or more example embodiments. With reference to FIG. 5, at step 505, a computing platform having at least one processor, a communication interface, and memory may receive, from a digital computing device, a quantum program of a plurality of quantum programs to be executed on target quantum hardware. At step 510, the computing platform may scan the quantum program and parse metadata associated with the quantum program using a first machine learning model including abstract syntax trees. In addition, the metadata may define contextual logic of the quantum program. At step 515, the computing platform may optimize the quantum program by modifying program code of the quantum program for minimum qubit consumption using a second machine learning model including a natural language processing model. At step 520, the computing platform may determine a criticality level of the quantum program based on the contextual logic associated with the quantum program. At step 525, the computing platform may determine a priority sequence of the quantum program based on the determined criticality level. In addition, the priority sequence may indicate an order in which the plurality of quantum programs are to be deployed to the target quantum hardware. At step 530, the computing platform may transmit the quantum program to the target quantum hardware according to the priority sequence.

Figure 6:
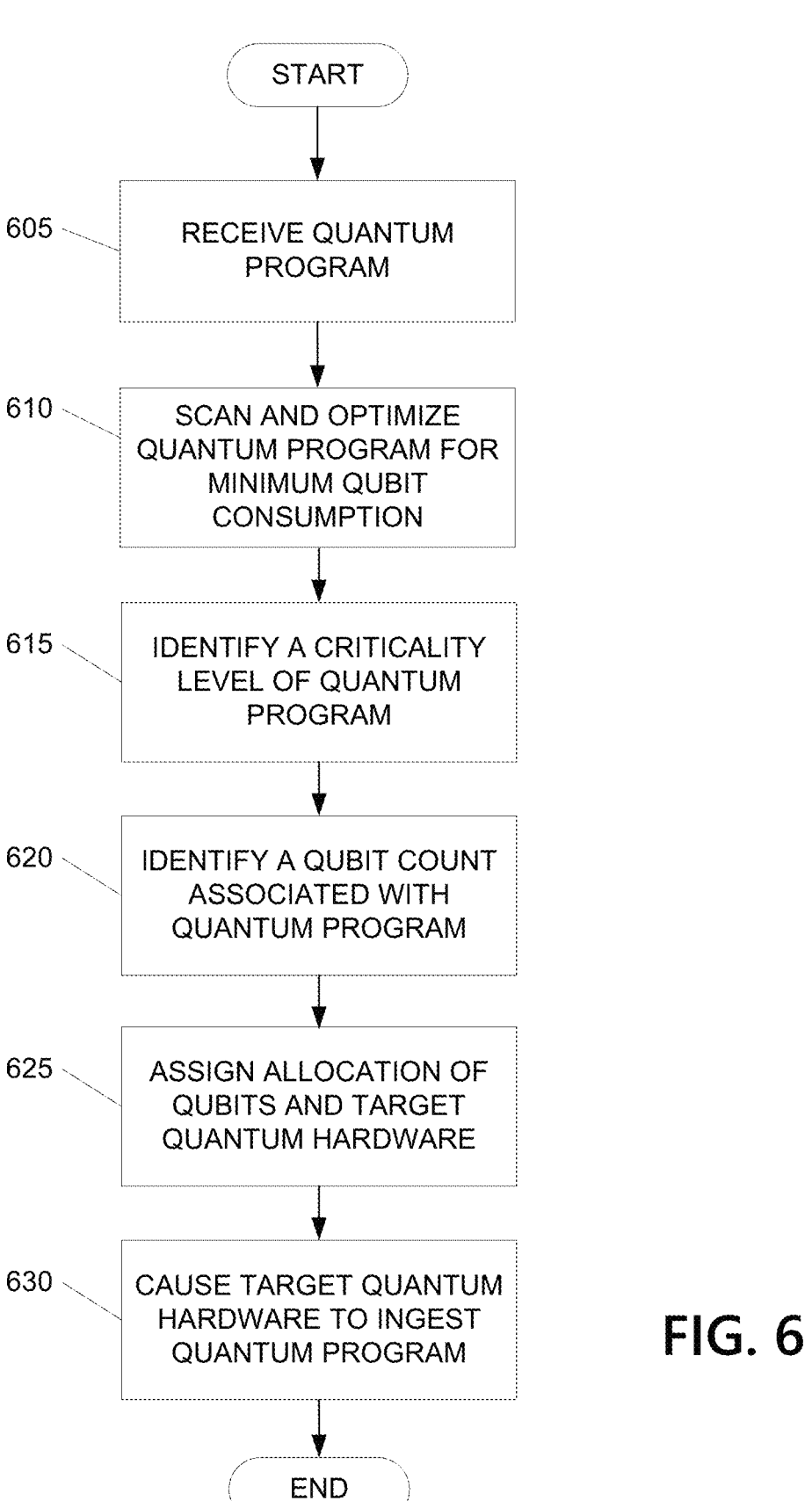

FIG. 6 depicts an illustrative method for intelligent orchestration of quantum programs using NFTs in accordance with one or more example embodiments. With reference to FIG. 6, at step 605, a computing platform having at least one processor, a communication interface, and memory may receive, from a digital computing device, a quantum program of a plurality of quantum programs to be executed on target quantum hardware. At step 610, the computing platform may scan and optimize the quantum program for minimum qubit consumption using one or more machine learning models. At step 615, the computing platform may identify a criticality level of the quantum program. In addition, the criticality level may be based on an accuracy requirement of a quantum program output. At step 620, the computing platform may identify a qubit count associated with the quantum program. In addition, the qubit count may indicate a number of qubits used to perform quantum processing of the quantum program. At step 625, based on the identified criticality level and the identified qubit count associated with the quantum program, the computing platform may assign an allocation of qubits together with specific target quantum hardware, from among a plurality of quantum hardware, for deploying the quantum program. At step 630, the computing platform may cause the specific target quantum hardware to ingest the quantum program and perform quantum processing of the quantum program.

Figure 7:
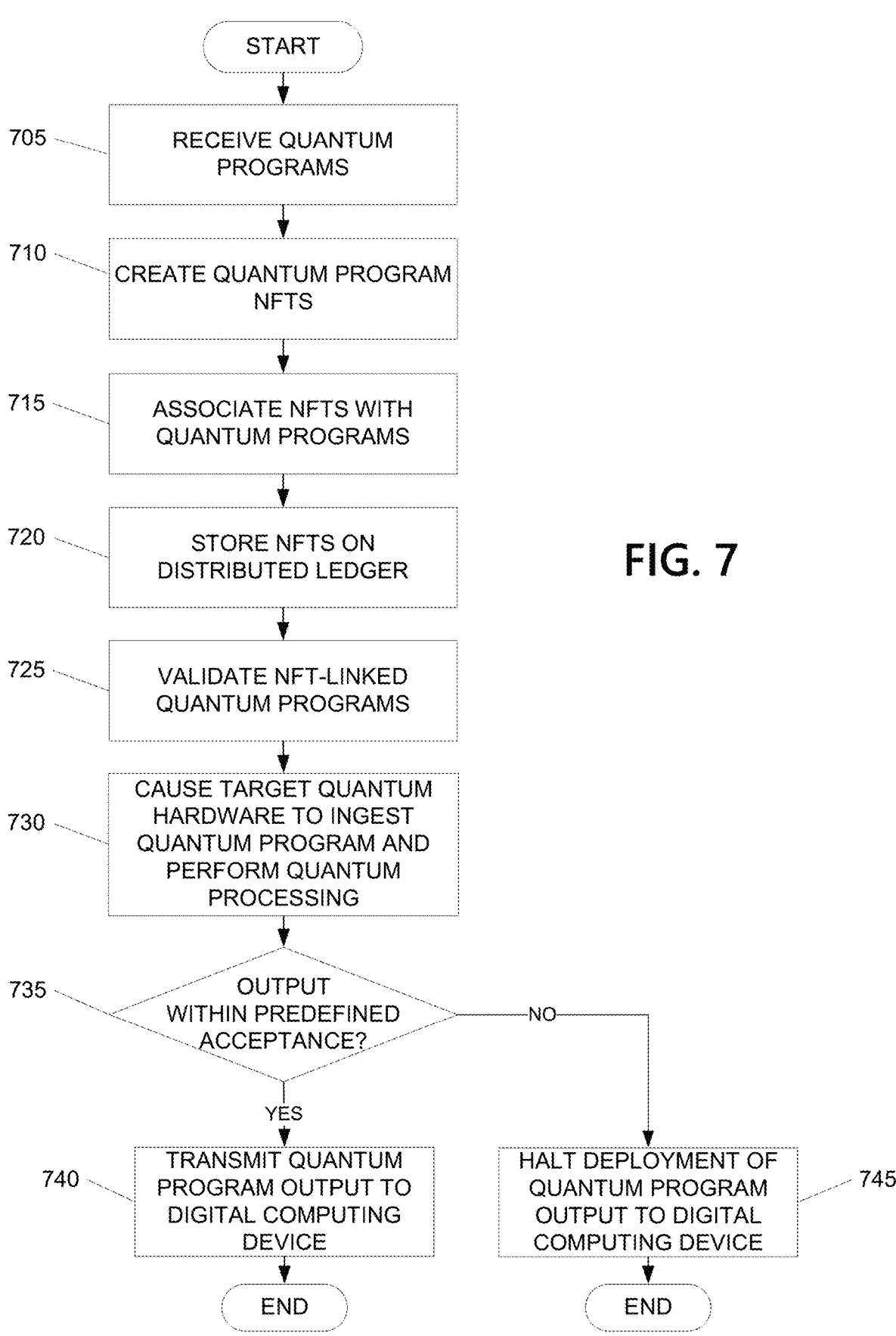

FIG. 7 depicts an illustrative method for intelligent orchestration of quantum programs using NFTs in accordance with one or more example embodiments. With reference to FIG. 7, at step 705, a computing platform having at least one processor, a communication interface, and memory may receive, from a digital computing device, a plurality of quantum programs to be executed on target quantum hardware. At step 710, the computing platform may create non-fungible tokens (NFTs) representing each of the plurality of quantum programs. At step 715, the computing platform may associate each of the NFTs with a respective one of the plurality of quantum programs. In addition, each of the NFTs may be controlled by smart contract logic associated with a smart contract. In addition, the smart contract logic may include a predefined acceptance criterion based on which a quantum processing output is deployed to the digital computing device. At step 720, the computing platform may store the NFTs on a distributed ledger. At step 725, the computing platform may validate a quantum program of the plurality quantum programs for respective target quantum hardware by validating the NFT associated with the quantum program. At step 730, the computing platform may cause the respective target quantum hardware to ingest the validated quantum program and perform quantum processing of the validated quantum program. At step 735, the computing platform may receive, from the target quantum hardware, output of the quantum processing and, using the smart contract logic associated with the smart contract for the respective NFT, the computing platform may determine whether the output of quantum processing meets the predefined acceptance criterion of the smart contract. At step 740, responsive to determining the output of quantum processing meets the predefined acceptance criterion of the smart contract, the computing platform may deploy the output of the quantum processing in the digital computing device, and the digital computing device may consume the quantum program output. At step 745, responsive to determining the output of quantum processing does not meet the predefined acceptance criterion of the smart contract, the computing platform may halt deployment of the output of the quantum processing to the digital computing device.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform comprising:

at least one processor;

a communication interface communicatively coupled to the at least one processor; and memory storing computer-readable instructions that, when executed by the at least one processor, cause the computing platform to:

receive, from a digital computing device, a quantum program of a plurality of quantum programs to be executed on target quantum hardware;

scan and optimize the quantum program for minimum quantum bit (qubit) consumption using one or more machine learning models;

identify a criticality level of the quantum program, wherein the criticality level is based on an accuracy requirement of a quantum program output;

identify a qubit count associated with the quantum program, wherein the qubit count indicates a number of qubits used to perform quantum processing of the quantum program;

based on the identified criticality level and the identified qubit count associated with the quantum program, assign an allocation of qubits together with specific target quantum hardware, from among a plurality of quantum hardware, for deploying the quantum program; and cause the specific target quantum hardware to ingest the quantum program and perform quantum processing of the quantum program.

2. The computing platform of claim 1, wherein optimizing the quantum program includes:

generating and sending, to the digital computing device, one or more code change recommendations for minimizing qubit consumption; and wherein the computing platform further includes instructions that, when executed, cause the computing platform to cause the digital computing device to prompt a user of the digital computing device to update the quantum program based on the one or more code change recommendations.

3. The computing platform of claim 1, wherein optimizing the quantum program includes dividing the quantum program into two or more logical portions, including a first logical portion and a second logical portion.

4. The computing platform of claim 3, wherein quantum processing of the first logical portion is allocated to first target quantum hardware, and wherein quantum processing of the second logical portion is allocated to second target quantum hardware.

5. The computing platform of claim 1, wherein the digital computing device is a computer of a developer writing one or more quantum programs.

6. The computing platform of claim 1, wherein the one or more machine learning models includes one or more of: abstract syntax trees, natural language processing, and clustering.

7. The computing platform of claim 1, further including instructions that, when executed, cause the computing platform to:

create a non-fungible token (NFT) representing the quantum program; and associate the NFT with the quantum program, wherein the NFT is controlled by smart contract logic associated with a smart contract, and wherein the smart contract logic includes a predefined acceptance criterion based on which the quantum program output is deployed to the digital computing device.

8. The computing platform of claim 7, further including instructions that, when executed, cause the computing platform to:

validate a quantum program for the specific target quantum hardware by validating the NFT associated with the quantum program.

9. A method, comprising:

at a computing platform comprising at least one processor, a communication interface, and memory:

receiving, by the at least one processor, from a digital computing device, a quantum program of a plurality of quantum programs to be executed on target quantum hardware;

scanning and optimizing, by the at least one processor, the quantum program for minimum quantum bit (qubit) consumption using one or more machine learning models;

identifying, by the at least one processor, a criticality level of the quantum program, wherein the criticality level is based on an accuracy requirement of a quantum program output;

identifying, by the at least one processor, a qubit count associated with the quantum program, wherein the qubit count indicates a number of qubits used to perform quantum processing of the quantum program;

based on the identified criticality level and the identified qubit count associated with the quantum program, assigning, by the at least one processor, an allocation of qubits together with specific target quantum hardware, from among a plurality of quantum hardware, for deploying the quantum program; and causing, by the at least one processor, the specific target quantum hardware to ingest the quantum program and perform quantum processing of the quantum program.

10. The method of claim 9, wherein optimizing the quantum program includes:

generating and sending, by the at least one processor, to the digital computing device, one or more code change recommendations for minimizing qubit consumption; and causing, by the at least one processor, the digital computing device to prompt a user of the digital computing device to update the quantum program based on the one or more code change recommendations.

11. The method of claim 9, wherein optimizing the quantum program includes dividing the quantum program into two or more logical portions, including a first logical portion and a second logical portion.

12. The method of claim 11, wherein quantum processing of the first logical portion is allocated to first target quantum hardware, and wherein quantum processing of the second logical portion is allocated to second target quantum hardware.

13. The method of claim 9, wherein the digital computing device is a computer of a developer writing one or more quantum programs.

14. The method of claim 9, wherein the one or more machine learning models includes one or more of: abstract syntax trees, natural language processing, and clustering.

15. The method of claim 9, further comprising:

creating, by the at least one processor, a non-fungible token (NFT) representing the quantum program; and associating, by the at least one processor, the NFT with the quantum program, wherein the NFT is controlled by smart contract logic associated with a smart contract, and wherein the smart contract logic includes a predefined acceptance criterion based on which the quantum program output is deployed to the digital computing device.

16. The method of claim 15, further comprising:

validating, by the at least one processor, a quantum program for the specific target quantum hardware by validating the NFT associated with the quantum program.

17. One or more non-transitory computer-readable media storing instructions that, when executed by a computing platform comprising at least one processor, memory, and a communication interface, cause the computing platform to:

receive, from a digital computing device, a quantum program of a plurality of quantum programs to be executed on target quantum hardware;

scan and optimize the quantum program for minimum quantum bit (qubit) consumption using one or more machine learning models;

identify a criticality level of the quantum program, wherein the criticality level is based on an accuracy requirement of a quantum program output;

identify a qubit count associated with the quantum program, wherein the qubit count indicates a number of qubits used to perform quantum processing of the quantum program;

based on the identified criticality level and the identified qubit count associated with the quantum program, assign an allocation of qubits together with specific target quantum hardware, from among a plurality of quantum hardware, for deploying the quantum program; and cause the specific target quantum hardware to ingest the quantum program and perform quantum processing of the quantum program.

18. The one or more non-transitory computer-readable media of claim 17, wherein optimizing the quantum program includes:

generating and sending, to the digital computing device, one or more code change recommendations for minimizing qubit consumption; and causing the digital computing device to prompt a user of the digital computing device to update the quantum program based on the one or more code change recommendations.

19. The one or more non-transitory computer-readable media of claim 17, wherein optimizing the quantum program includes dividing the quantum program into two or more logical portions, including a first logical portion and a second logical portion.

20. The one or more non-transitory computer-readable media of claim 19, wherein quantum processing of the first logical portion is allocated to first target quantum hardware, and wherein quantum processing of the second logical portion is allocated to second target quantum hardware.

* * * * *